United States Patent Office 3,429,781
Patented Feb. 25, 1969

3,429,781
PROCESS FOR THE PRODUCTION
OF TETRACYCLINE
Karel Culik, 1772 Petriny; Milos Herold, 112 Nadrazni;
Josef Palkoska, 2 Skorepka; Bohumil Sikyta, 4 Pocatecka; and Josef Slezak, 486 U Krcske vodarny, all of
Prague, Czechoslovakia
No Drawing. Filed June 10, 1965, Ser. No. 463,986
Claims priority, application Czechoslovakia,
June 13, 1964, 3,414/64
U.S. Cl. 195—80                     11 Claims
Int. Cl. C12d 9/18

ABSTRACT OF THE DISCLOSURE

In a process of producing tetracycline by submerged fermentation in liquid nutrient media containing assimilable carbon and nitrogen source plus inorganic nutrient salts under aerobic conditions by means of producing microorganisms belonging to the genus Streptomyces, which are capable of producing both chlortetracycline and tetracycline followed by isolation of the antibiotic from the fermented broth, the improvement comprising adding to the fermentation media at least one organic tetracycline chlorination inhibitor together with benzyl thiocyanate.

---

The present invention relates to an improvement in the production of tetracycline by submerged fermentation in liquid nutrient media containing assimilable carbon and nitrogen sources plus inorganic nutrient salts, under aerobic conditions, with the aid of producing microorganisms of the genus Streptomyces, such as are capable of producing both chlortetracycline and tetracycline, the fermentation being followed by isolation from the fermented broth.

Microorganisms belonging to the genus Streptomyces that are capable of producing chlortetracyline (CTC) under a given set of cultivation conditions often produce tetracycline (TC) under a different set of conditions. An increase in TC production and, at the same time, suppression of CTC production may be achieved e.g. by elimination of chloride ions from the medium (Canadian Patent 542,622) or by the addition to the medium of compounds inhibiting the incorporation of chlorine in the tetracycline molecule (antimetabolites). One group of such antimetabolites is represented by inorganic bromine salts (Canadian Patent 602,697) which act as competitive inhibitors against chloride ions. Another group comprises compounds usually containing nitrogen and sulphur in the molecule (J. J. Goodman et al., J. Bact. 78, 432, 1959).

The effect of these organic antimetabolites upon the chlorine incorporation into the tetracycline molecule has the character of non-competitive inhibition. They act by binding the Cu-ions, which cause the chlorination as enzyme-coenzymes, through chelation (J. J. Goodman et al., J. Bact. 78, 432, 1959). The addition of these substances to cultivation media shifts the ratio of the antibiotics formed during fermentation to the tetracycline side even though high concentrations of chloride ions may be present. However, for the tetracycline production to be economical, it is necessary to add these organic antimetabolites to the medium in amounts adequate to bring the share of tetracycline in the total of the two simultaneously formed antibiotics up to at least 90%. Unfortunately, at the concentration necessary to achieve this, the antimetabolites usually start exhibiting a toxic effect on the antibiotic production with the result that the overall yield is depressed. Thus, we have this antagonistic proposition: the antimetabolite is that much more useful for tetracycline production as its chlorination inhibiting effects is stronger while its toxicity for producing microorganisms must be lower.

It is therefore an object of the present invention to improve the TC yield in a process wherein both TC and CTC producing microorganisms are used without substantially lowering the overall yield.

More specifically, it is an object of the invention to improve the yield in the defined type of processes when using strong chemical chlorination inhibitors. It is in particular the object of the invention, to accomplish such improvement with mercapto-type chlorination inhibitors.

In a broader sense it is an object of the invention to improve both the overall yield and the TC to CTC ratio when using certain growth stimulating additives in the above mentioned processes.

The present inventors have found that the use of benzyl thiocyanate (BTC) together with the organic antimetabolite-containing media not only increases total antibiotic production but has the desired negative effect on the incorporation of chlorine into the tetracycline molecule. While the BTC lowers the toxicity of the organic antimetabolites used, it strengthens on the other hand, their inhibiting effect on chlorination, whereby within a certain range of antimetabolite concentrations a further shift in CTC:TC ratio towards TC predominance may be achieved.

It has been known for some time that benzyl thiocyanate alone accelerates both CTC and TC production and increases their overall yield. The mechanism of this effect was studied in detail and a probable hypothesis for it has been postulated (J. Rostalek, Fol. michobiologica 9, 78, 89, 96, 1964).

In distinction the present process of tetracyline production is based on the principle to perform the femmentation in a nutrient medium containing one or several chlorination inhibitors in combination with the benzyl thiocyanate.

For the fermentations, nutrient media containing the chlorination inhibitor in a 0.0001 to 0.05% concentration and containing the BTC in an amount from 0.0001 to 0.002% are preferable.

As chlorination inhibitors, 3-mercapto-5-hydroxy-6-methyl-1,2,4-triazine, 3-mercapto-5-hydroxy-6-benzyl-1,2,4-triazine, or 2-mercaptobenzthiazole may be used advantageously.

Apart from these compounds, other types of inhibitors may be employed, such as 5-vinylthiooxazolidone or natural inhibitors obtained from plants belonging to the genus Brassica.

It was entirely unexpected and surprising to find that the addition of BTC to media containing a suitable concentration of an organic antimetabolite does enhance the tetracycline yield from two sides, increasing the inhibiting effect and lowering the toxicity and that the increase in TC yield is higher than could be expected merely on the basis of regular stimulation of production of either of the two antibiotics. Expressed differently, the use of a given organic chlorine inhibitor together with BTC accomplishes an improved antimetabolic effect by the inhibitor, since its toxicity is lowered and its inhibiting effect is enhanced.

The following examples are given to illustrate the process of the invention without being intended to limit its scope.

EXAMPLE I

A fermentation medium was prepared as follows:

|  | Percent |
|---|---|
| Sucrose | 4 |
| Soybean meal | 3 |
| Ammonium sulfate | 0.5 |
| Calcium carbonate | 0.5 |
| Molasses | 0.2 |
| Corn-steep liquor (65% solids) | 0.4 |
| Sodium chloride | 0.038 |

The medium was inoculated with 5% of a 24 hr. old culture of the strain *Streptomyces aureofaciens* grown on a medium of identical composition, but without NaCl. For cultivation, fermentors in a 10 liter volume were used. The cultivation proceeded under aeration and agitation at a temperature of 30° C. for 84 to 92 hours.

Control media were also used without anti-metabolites and without BTC. In these media the average production of CTC was .01% to .02% (1000–2000 u./ml.)

In addition to assaying at regular intervals the total tetracycline antibiotic concentration, the TC:CTC ratio was determined at the end of each run chromatographically by comparison with a series of standards. To some of the fermentation media, BTC was added, dissolved in acetic acid and sterilized, to obtain a final BTC concentration in the medium of 0.0004%, which concentration was found to be sufficient for maximum stimulation of overall yields. As the antimetabolite, 3-mercapto-5-hydroxy-6-methyl-1,2,4-triazine was used, which has been shown to possess a potent inhibiting effect on chlorination. This compound was added after sterilization in a sterilized aqueous suspension at several concentration levels.

In the following table the yield is expressed in percentages relative to a standard of 100 which is the same in columns B and C and refers to a control wherein neither BTC nor an inhibitor were used. The further entries in column B illustrate the percentage yield without use of BTC, and in column C with the use of BTC. Column D likewise gives yield with BTC but shows percentages relative to a base (100) wherein BTC, though no inhibitor, was used.

TABLE I

| Inhibitor conc. in medium (percent) | Overall yield of antibiotic activity in media without BTC | Overall yield of antibiotic activity in media with BTC | | CTC:TC ratio [3] |
|---|---|---|---|---|
| A | B [1] | C [1] | D [2] | E |
| 0 | [4] 100 | 250 | [4] 100 | 90:10 |
| 0.004 | 80 | 230 | 92 | 10:90 |
| 0.008 | 34 | 150 | 60 | 5:95 |

[1] Base 100: no BTC.
[2] Base 100: with BTC.
[3] No difference was found in the CTC:TC ratio as between media with and without BTC.
[4] Control.

Table I shows that the inhibition of the overall yield caused by the toxic effect of high concentration of the antimetabolite is lowered to about one half in the presence of BTC.

EXAMPLE II

The fermentation was carried out in the same way as in Example I. Instead of the triazine derivative, however, 2-mercaptobenzthiazole (MBT) was used as the antimetabolite. The percentage figures in regard to the overall yield given in columns B and C refer to the same base as in columns B and C of Example I.

TABLE II

| MBT conc. in medium | Overall antibiotic production in media without BTC | Overall antibiotic production in media containing BTC | CTC:TC ratio in media without BTC | CTC:TC ratio in media with BTC |
|---|---|---|---|---|
| A | B | C | D | E |
| 0 | [1] 100 | 239 | 95:5 | 85:15 |
| 0.01 | 110 |  | 35:65 |  |
| 0.0015 | 26 |  | 20:80 |  |
| 0 | 100 | 545 | 95:5 | 95:5 |
| 0.0005 | 230 |  | 95:5 |  |
| 0.006 | 250 | 370 | 35:65 | 25:75 |
| 0 | 100 | 274 | 95:5 | 90:10 |
| 0.008 | 182 | 270 | 35:65 | 15:85 |

[1] Control.

As appears from the table, MBT, in contrast to other anti-metabolites, enhances total tetracycline antibiotic production, when used at low concentrations.

The combined presence of MBT and BTC in the media therefore, has a truly synergistic effect on the shift in the CTC:TC ratio towards TC predominance.

We claim:

1. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlorotetracycline and tetracycline followed by isolation of the antibiotic from the fermented broth, the improvement comprising adding to the fermentation media at least one organic tetracycline chlorination inhibitor together with benzyl thiocyanate.

2. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlorotetracycline and tetracycline followed by isolation of the antibiotic from the fermented broth, the improvement comprising adding to the fermentation media at least one organic tetracycline chlorination inhibitor together with benzyl thiocyanate, the chlorination inhibitor being present at a concentration between .0001 to .05%.

3. In a process of producing tetracycline by submerged fermentation in liquid nturient media containing assimilable carbon and nitrogen sources plus inorganic nutrient salts under aerobic conditons by means of prducing microorganisms belonging to the genus Streptomyces, which are capable of producing both chlorotetracycline and tetracycline followed by isolation of the antibiotic from the fermented broth, the improvement comprising adding to the fermentation media at least one organic tetracycline chlorination inhibitor together with benzylthiocyanate, the latter being present at a concentration between .0001 and .002%.

4. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlorotetracycline and tetracycline followed by isolation of the antibiotic from the fermented broth, the improvement comprising adding to the fermentation media at least one organic tetracycline chlorination inhibitor together with benzyl thiocyanate, the chlorination inhibitor being present at a concentration between .0001 to .05% and the benzyl thiocyanate being present at a concentration between .0001 and .002%.

5. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlortetracycline and tetracycline followed by isolation of the antibiotic from the fermented broth, the improvement comprising adding to the fermentation media at least one organic tetracycline chlorination inhibitor together with benzyl thiocyanate, the chlorination inhibitor being a member selected from the group consisting of 3-mercapto-5-hydroxy - 6-methyl-1,2,4-triazine, 3-mercapto-5-hydroxy-6-benzyl-1,2,4,-triazine nad 2-mercaptobenzthiazole.

6. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlortetracycline and tetracycline followed by isolation of the antibiotic from the fermented broth, the improvement comprising adding to the fermentation media 5-vinylthiooxazolidone as chlorination inhibitor together with benzyl thiocyanate.

7. In a process of producing tetracycline according to claim 1, said chlorination inhibitor being a member selected from the group consisting of plants belonging to the genus Brassica.

8. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlortetracycline and tetracycline followed by isolation of the antibiotic from the fermented broth, the improvement comprising adding to the fermentation media 2-mercapto-5-hydroxy-6-methyl-1,2,4-triazine as chlorination inhibitor together with benzyl thiocyanate.

9. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable producing both chlorotetracycline and tetracycline followed by ioslation of the antibiotic from the fermented broth, the improvement comprising adding to the fermentation media 3-mercapto-5-hydroxy-6-benzyl-1,2,4-triazine together with benzyl thiocyanate.

10. In a process of producing tetracycline by submerged fermentation in liquid nutrient media containing assimilable carbon and nitrogen sources plus inorganic nutrient salts under aerobic conditions by means of producing microorganisms belonging to the genus Streptomyces, which are capable of producing both chlortetracycline and tetracycline followed by isolation of the antibiotic from the fermented broth, the improvement comprising adding to the fermentation media 3-mercaptobenzthiazole together with benzyl thiocyanate, the mercapto inhibitor being present at a concentration of between .0001 and .05%.

11. The process of claim 10 wherein the benzyl thiocyanate is present at a concentration between .0001 and .002%.

References Cited

UNITED STATES PATENTS 3,019,173   1/1962   Arishima et al. _____ 195—80

FOREIGN PATENTS 1,074,826   2/1960   Germany.

MAURICE W. GREENSTEIN, *Primary Examiner.*

U.S. Cl. X.R.

195—114